(12) United States Patent
Kinney, Jr et al.

(10) Patent No.: US 11,803,420 B1
(45) Date of Patent: Oct. 31, 2023

(54) EXECUTION OF REPLICATED TASKS USING REDUNDANT RESOURCES

(71) Applicant: Amazon Technologies, Inc., Seattle, WA (US)

(72) Inventors: James Edward Kinney, Jr, Seattle, WA (US); Dougal Stuart Ballantyne, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 679 days.

(21) Appl. No.: 15/385,751

(22) Filed: Dec. 20, 2016

(51) Int. Cl.
*G06F 9/50* (2006.01)

(52) U.S. Cl.
CPC .................................. *G06F 9/5005* (2013.01)

(58) Field of Classification Search
CPC ............... G06F 2209/5014; G06F 2209/5019; G06F 9/5083
See application file for complete search history.

(56) References Cited

U.S. PATENT DOCUMENTS

| | | | | |
|---|---|---|---|---|
| 5,513,354 | A * | 4/1996 | Dwork et al. | G06F 11/1425 714/10 |
| 7,356,770 | B1 | 4/2008 | Jackson | |
| 7,810,099 | B2 | 10/2010 | Dettinger et al. | |
| 8,245,235 | B1* | 8/2012 | Belady et al. | G06F 11/008 718/104 |
| 8,676,622 | B1* | 3/2014 | Ward, Jr. et al. | G06Q 10/06313 705/7.12 |
| 8,793,365 | B2 | 7/2014 | Arsovski et al. | |
| 8,990,820 | B2 | 3/2015 | Plancarte et al. | |
| 9,063,946 | B1* | 6/2015 | Barber et al. | G06F 16/125 |
| 9,110,731 | B1* | 8/2015 | Sicola et al. | G06F 9/5077 |
| 9,235,446 | B2 | 1/2016 | Bruno et al. | |
| 9,239,996 | B2 | 1/2016 | Moorthi et al. | |

(Continued)

OTHER PUBLICATIONS

"Quick Start User Guide", Retrieved from URL: https://slurm.schedmd.com/quickstart.html on Dec. 14, 2016, Pages 1-12.

(Continued)

*Primary Examiner* — Wynuel S Aquino
(74) *Attorney, Agent, or Firm* — Robert C. Kowert; Kowert, Hood, Munyon, Rankin & Goetzel, P.C.

(57) ABSTRACT

Methods, systems, and computer-readable media for execution of replicated tasks using redundant resources are disclosed. Replicas of a task are generated. Computing resources are selected from at least one pool of computing resources of a provider network. The provider network includes a plurality of pools of computing resources that vary in a characteristic, and the computing resources are selected based (at least in part) on the characteristic. Concurrent execution of the replicas of the task is initiated using the selected computing resources. Input data for the concurrent execution does not vary from one of the replicas to another of the replicas, and at least a portion of the replicas produce individual results for the input data. Based (at least in part) on a policy, an individual result of one or more of the replicas is selected as a final result of the task.

20 Claims, 10 Drawing Sheets

(56) References Cited

U.S. PATENT DOCUMENTS

| | | | |
|---|---|---|---|
| 9,697,224 B1* | 7/2017 | Factor et al. | G06F 16/162 |
| 10,061,613 B1* | 8/2018 | Brooker et al. | G06F 9/5005 |
| 2002/0082856 A1* | 6/2002 | Gray et al. | G06F 9/50 |
| | | | 718/104 |
| 2005/0149609 A1* | 7/2005 | Lamport | H04L 67/10 |
| | | | 709/200 |
| 2006/0152756 A1* | 7/2006 | Fellenstein et al. | G06Q 40/04 |
| | | | 358/1.15 |
| 2007/0294697 A1* | 12/2007 | Theimer et al. | G06F 9/5027 |
| | | | 718/102 |
| 2009/0172168 A1* | 7/2009 | Sonoda et al. | G06F 11/3409 |
| | | | 709/226 |
| 2010/0114824 A1* | 5/2010 | Krishnaprasad et al. | G06F 11/2094 |
| | | | 707/637 |
| 2010/0319005 A1* | 12/2010 | Erignac | G06F 9/52 |
| | | | 719/315 |
| 2011/0161964 A1* | 6/2011 | Piazza et al. | G06F 9/4881 |
| | | | 718/102 |
| 2011/0231847 A1* | 9/2011 | Lategan | G06F 9/451 |
| | | | 718/100 |
| 2011/0276977 A1* | 11/2011 | van Velzen et al. | G06F 9/5038 |
| | | | 718/104 |
| 2011/0289344 A1* | 11/2011 | Bae et al. | G06F 11/0709 |
| | | | 714/E11.073 |
| 2012/0167101 A1* | 6/2012 | Kandula et al. | H04L 67/325 |
| | | | 718/102 |
| 2013/0111261 A1* | 5/2013 | Dalton | G06F 11/2097 |
| | | | 714/E11.073 |
| 2013/0151927 A1* | 6/2013 | Leggette et al. | G06F 11/10 |
| | | | 714/763 |
| 2013/0227558 A1* | 8/2013 | Du et al. | H04L 67/18 |
| | | | 718/1 |
| 2013/0346425 A1* | 12/2013 | Bruestle | G06F 9/5066 |
| | | | 707/752 |
| 2014/0096130 A1* | 4/2014 | Saniee et al. | G06F 9/5027 |
| | | | 718/1 |
| 2014/0359628 A1* | 12/2014 | Braham et al. | G06Q 10/105 |
| | | | 718/102 |
| 2015/0074251 A1* | 3/2015 | Tameshige et al. | G06F 11/202 |
| | | | 709/221 |
| 2015/0215173 A1* | 7/2015 | Dutta et al. | G06F 9/505 |
| | | | 709/226 |
| 2015/0261580 A1* | 9/2015 | Shau et al. | G06F 9/4881 |
| | | | 718/106 |
| 2016/0085640 A1* | 3/2016 | Andrade Costa et al. | G06F 11/1482 |
| | | | 714/15 |
| 2016/0098292 A1* | 4/2016 | Boutin et al. | G06F 9/505 |
| | | | 718/104 |
| 2016/0124657 A1* | 5/2016 | Resch | G06F 3/065 |
| | | | 711/114 |
| 2016/0147569 A1* | 5/2016 | Cowling et al. | G06F 16/22 |
| | | | 718/104 |
| 2016/0179581 A1* | 6/2016 | Soundararajan et al. | G06F 9/5033 |
| | | | 718/104 |
| 2017/0052826 A1* | 2/2017 | Sasaki et al. | G06F 9/5083 |
| 2017/0188391 A1* | 6/2017 | Rajagopal et al. | H04W 74/0816 |
| 2017/0235600 A1* | 8/2017 | Morosan et al. | G06F 9/545 |
| | | | 718/104 |
| 2017/0371718 A1* | 12/2017 | Ko et al. | H04L 67/10 |
| 2018/0131678 A1* | 5/2018 | Agarwal et al. | G06F 9/54 |

OTHER PUBLICATIONS

Wang, W. J. et al. Adaptive scheduling for parallel tasks with QoS satisfaction for hybrid cloud environments. (2013). The Journal of Supercomputing, 66(2), 783-811. (Year: 2013).*

* cited by examiner

EXECUTION OF REPLICATED TASKS USING REDUNDANT RESOURCES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. Such resources at data centers, when accessed by remote customers, may be said to reside "in the cloud" and may be referred to as cloud computing resources.

The advent of virtualization technologies for commodity hardware has provided benefits with respect to managing large-scale computing resources for many clients with diverse needs. For example, virtualization technologies may allow a single physical computing device to be shared among multiple users by providing each user with one or more virtual machines hosted by the single physical computing device. Each such virtual machine may be a software simulation acting as a distinct logical computing system that provides users with the illusion that they are the sole operators and administrators of a given hardware computing resource, while also providing application isolation and security among the various virtual machines. With virtualization, the single physical computing device can create, maintain, or delete virtual machines in a dynamic manner. The use of virtualization with cloud computing resources to run client programs may enable some clients to access a much greater amount of computing capacity at a given time than would be possible with the clients' on-premises resources.

Figure 1:
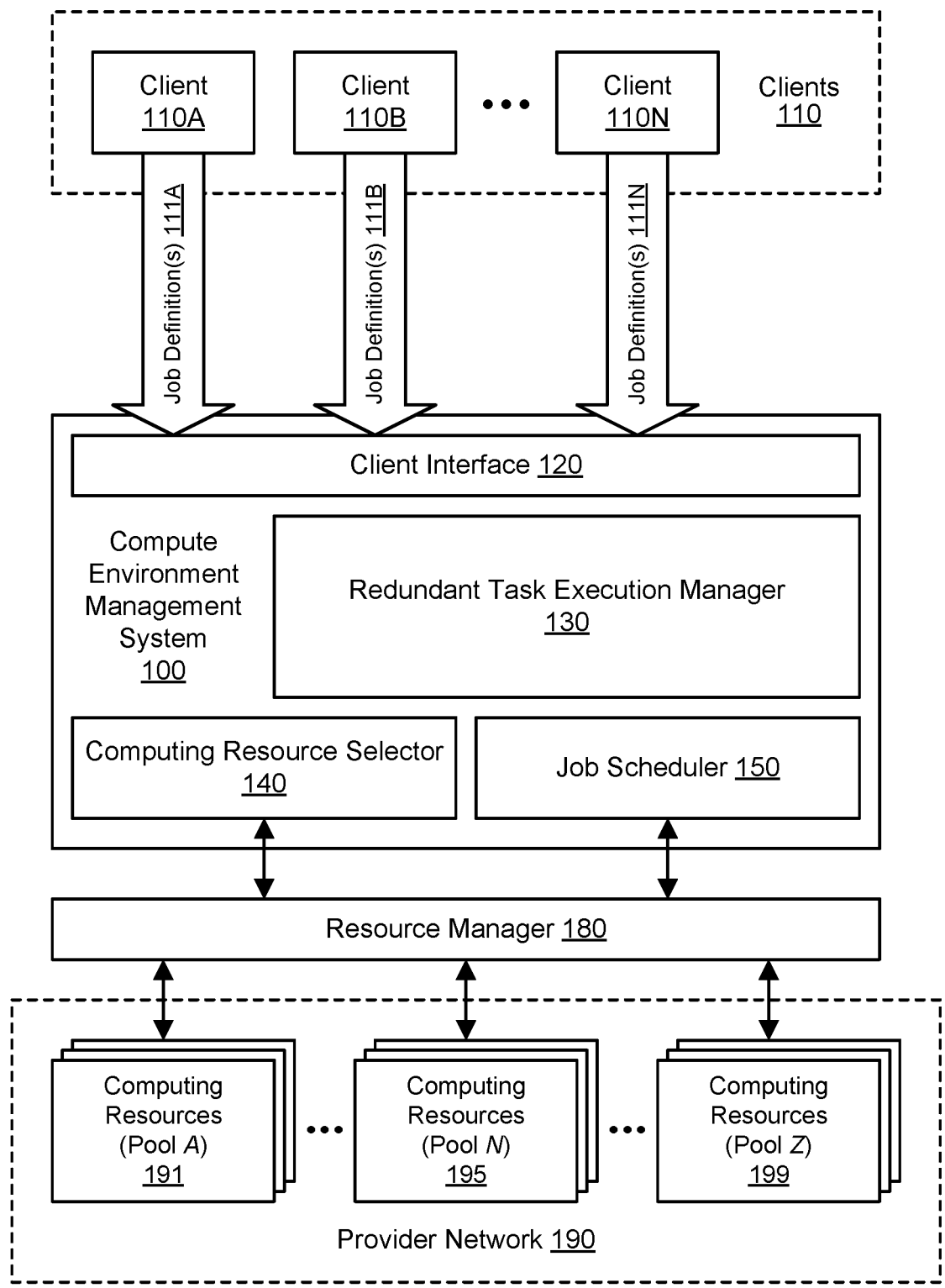
FIG. 1 illustrates an example system environment for execution of replicated tasks using redundant resources, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for execution of replicated tasks using redundant resources are described. Using the techniques described herein, a task supplied by a client may be replicated and executed in parallel in an array of computing resources such as compute instances. The computing resources in the array may be selected from one or more resource pools of a multi-tenant provider network that offers different resource pools. The resources in the different pools may vary in one or more characteristics that are relevant to the execution of replicated tasks using redundant resources. In one embodiment, the resources may vary in an execution characteristic associated with the interruptibility or reliability of task execution using an individual resource. The selected resources may typically be more interruptible and/or less reliable than other resources offered by the provider network. For example, the selected compute instances may be reserved from a less expensive spot market (in which an instance reservation may not be guaranteed to be maintained if a higher bid is received) instead of a more expensive on-demand market (in which an instance reservation may be guaranteed for an agreed-upon duration, e.g., one hour). Although the selected instances may individually be interruptible or less reliable, the concurrent use of multiple instances may collectively be more reliable, less costly, and/or quicker to generate a single result (from at least one instance in the array) than using a single instance of a more expensive type. In one embodiment, the task replication and concurrent execution may be performed without the client who supplied the task necessarily directing or being aware of the replication and concurrent execution. In one embodiment, the result of the task may be determined by the first task replica to successfully complete. In one embodiment, the result of the task may be determined by agreement of more than one task replica to successfully complete, e.g., to validate the first result of one replica with subsequent results of other replicas. In one embodiment, the computing resources may be deployed in different compute environments, and the task replicas may be queued in job queues mapped to the compute environments. In one embodiment, the computing resources may be deployed in different geographical locations to achieve greater reliability across the array.

FIG. 1 illustrates an example system environment for execution of replicated tasks using redundant resources, according to one embodiment. A compute environment management system 100 may manage various compute environments on behalf of clients. Based (at least in part) on information provided by clients, such as descriptions of computing resources to be used in compute environments and queues mapped to those environments, the compute environment management system 100 may automatically provision and deprovision computing resources for the compute environments. For example, within user-defined constraints, the compute environment management system 100 may automatically grow or shrink a particular compute environment to meet the requirements of jobs that the user expects to be executed in the environment. As described herein, the compute environment management system 100 may implement task replication and concurrent execution as managed (at least in part) by a redundant task execution manager 130. The redundant task execution manager 130 may perform operations such as generating replicas of tasks, deploying the tasks to compute environments for concurrent execution, and marshalling any individual results of individual replicas.

The compute environment management system 100 may include a client interface 120 that permits interaction with the clients 110A-110N, e.g., such that the client can submit job definitions and potentially configuration information for compute environments. Using the client interface 120, the compute environment management system 100 may receive job definitions such as one or more job definitions 111A from client 110A, one or more job definitions 111B from client 110B, and one or more job definitions 111N from client 110N. One or more workloads of jobs may be received from a particular client device in one batch or in multiple batches over a period of time. The jobs may be defined by one or more job definitions. The job definitions may be received by the compute environment management system 100 through any appropriate client interface 120, potentially including one or more application programming interfaces (APIs), other programmatic interfaces, and/or user interfaces.

A job definition may describe one or more tasks to be performed by computing resources in the provider network 190. The tasks within a job definition may include entirely different tasks (e.g., tasks having different program code) and/or tasks that run the same program code for different input data. For a particular task, a job definition may include or reference program instructions to be executed in processing the task. The job definition may include or be associated with a job identifier. A job definition may include or reference a set of input data to be processed using the program instructions, potentially using multiple copies of an application or set of program code to process different elements of the input data sequentially or concurrently. A job definition may also include or be provided with other suitable metadata, including timing information (e.g., a time to begin processing the workload, an anticipated time to run the workload, and/or a deadline), budgetary information, anticipated resource usage, and so on. For example, the anticipated resource usage in a job definition may indicate one or more values (including a range of values) for anticipated processor usage (e.g., a number of virtual CPUs), memory usage, storage usage, network usage, and/or other hardware resource characteristics.

The client interface 120 may be used for receipt of other input from clients 110A-110N; the input may represent user input and/or input generated programmatically. For example, the input may specify or reference one or more constraints and/or one or more queue identifiers for a particular compute environment. Based (at least in part) on the input, the compute environment management system 100 may generate a compute environment specification for a compute environment associated with a particular client. The compute environment management system 100 may then manage, on behalf of the client, resources in a compute environment consistent with the specification. Alternatively, the compute environment management system 100 may permit the client to perform management of computing resources within a compute environment, potentially including provisioning, deprovisioning, assignment of jobs, and/or configuration of resources. In one embodiment, task replicas may be executed in parallel in a single compute environment. In one embodiment, task replicas may be executed in parallel in a plurality of compute environments.

A compute environment specification may also include additional metadata or configuration data usable for managing a set of computing resources. The additional metadata or configuration data may represent other properties or attributes of the compute environment or its constituent resources. For example, the compute environment specification may associate particular labels (including alphanumeric labels) with particular resources for ease of resource management. As another example, the compute environment specification may include data associating a compute environment with a virtual private cloud (VPC) representing a virtual network, e.g., within the provider network 190. The VPC may be isolated from other resources and VPCs within the provider network 190 and may have its own range of IP addresses referred to as a subnet; resources in the compute environment may be launched into the subnet.

The compute environment management system 100 may include a computing resource selector component 140. Using the computing resource selector 140, the compute environment management system 100 may select and reserve (by interacting with the resource manager 180) one or more computing resources offered by a provider network 190, e.g., for concurrent execution of replicas of a particular task. In one embodiment, for a particular compute environment, the computing resource selector 140 may select computing resources having particular configurations, such as compute instances of particular instance types and/or software configurations with particular parameter values. In one embodiment, the particular configurations may be selected based (at least in part) on input from a client, such as a list of instance types that are usable within a compute environment or a list of instance types on which a task is to be tested for optimization purposes. In one embodiment, the particular configurations may be selected without input from a client, e.g., automatically and/or programmatically by one or more components of the compute environment management system 100. Particular configurations may be selected based on job definitions. For example, if a job definition indicates that a particular number of virtual CPUs is required for a task, or a particular amount of memory is required, then only computing resources that meet or exceed such requirements may be selected in one embodiment.

The computing resources used for concurrent execution of replicas of a particular task may be selected from one or more resource pools of a provider network 190 that offers different resource pools. For example, as shown in FIG. 1, the provider network may include computing resources in different resource pools such as resources 191 in one pool A, resources 195 in another pool N, and resources 199 in yet another pool Z. Although three resource pools are shown for purposes of illustration and example, any suitable number and configuration of resource pools may be used with the compute environment management system 100. The computing resources 191, 195, and 199 may include compute instances, storage instances, and so on. In one embodiment, the different pools may vary in the hardware characteristics of their constituent resources, such as a processor capability or configuration, a memory capability or configuration, a storage capability or configuration, a networking capability or configuration, and so on. In one embodiment, the different pools may vary in geographical location, potentially including different availability zones as configured by the operator of the provider network 190. The availability zones may represent locations or areas within regions, and the regions may be defined by appropriate boundaries (e.g., geographic, business-based, political, and/or arbitrary). In one embodiment, the different pools may represent different purchasing modes offered by the provider network 190. For example, the computing resources 191 may be offered in a spot market in which an instance reservation are not be guaranteed to be maintained if a higher bid is received, the computing resources 195 may be offered in an on-demand market in which an instance reservation may be guaranteed for an agreed-upon duration (e.g., one hour), and the computing resources 199 may be offered in an long-term market in which an instance reservation may be guaranteed for a longer duration (e.g., one year). The different purchasing modes may be associated with different costs to clients, e.g., such that spot instances 191 are typically less expensive per unit of time than on-demand instances 195.

The resources in the different pools may vary in one or more characteristics that are relevant to the execution of replicated tasks using redundant resources, also referred to herein as execution characteristics. In one embodiment, the resources may vary in an execution characteristic associated with the interruptibility or reliability of task execution using an individual resource. The selected resources may typically be more interruptible and/or less reliable than other resources offered by the provider network 190. For example, the selected compute instances may be reserved from a less expensive spot market (in which an instance reservation may not be guaranteed to be maintained if a higher bid is received) instead of a more expensive on-demand market (in which an instance reservation may be guaranteed for an agreed-upon duration, e.g., one hour). Although the selected instances may individually be interruptible or less reliable, the concurrent use of multiple instances may collectively be more reliable, less costly, and/or quicker to generate a single result (from at least one instance in the array) than using a single instance of a more expensive type. If the cost per instance of the selected pool (e.g., a pool of spot instances) is sufficiently less than the cost per instance of another pool (e.g., a pool of on-demand instances), then the use of multiple instances from the selected pool may be less costly or the same cost to produce a result of a task than if the more expensive pool were used.

The compute environment management system 100 may also include a job scheduler component 150. Using the job scheduler 150, the compute environment management system 100 may receive job definitions 111A-111N from clients 110A-110N and cause those jobs to be executed using the computing resources in compute environments associated with the clients. The job scheduler 150 may implement one or more queues associated with queue identifier(s) provided by a client and mapped to a particular compute environment. The job scheduler 150 may determine a time at which to initiate execution of a particular job within a compute environment associated with the client that provided the job. In one embodiment, the job scheduler 150 and/or computing resource selector 140 may determine one or more particular computing resources with which to initiate execution of a particular job within a compute environment associated with the client that provided the job.

The client devices 110A-110N may represent or correspond to various clients, users, or customers of the compute environment management system 100 and of the provider network 190. The clients, users, or customers may represent individual persons, businesses, other organizations, and/or other entities. The client devices 110A-110N may be distributed over any suitable locations or regions. A user of a client device may access the compute environment management system 100 with a user account that is associated with an account name or other user identifier. The user may belong to an organization (e.g., a business entity) that is a client or customer of the compute environment management system 100, e.g., with an arrangement in place to pay fees for use of the compute environment management system and/or provider network 190. The user account may be controlled by an individual user or by multiple users within an organization. Each of the client devices 110A-110N may be implemented using one or more computing devices, any of which may be implemented by the example computing device 3000 illustrated in FIG. 10. The clients 110A-110N may be coupled to the compute environment management system 100 via one or more networks, potentially including the Internet. Although three clients 110A, 110B, and 110N are shown for purposes of illustration and example, it is contemplated that any suitable number and configuration of client devices may be used to provide configuration information and jobs 111A-111N to the compute environment management system 100 and provider network 190.

The client devices 110A-110N may encompass any type of client configurable to submit configuration information to the compute environment management system 100. For example, a given client device may include a suitable version of a web browser, or it may include a plug-in module or other type of code module configured to execute as an extension to or within an execution environment provided by a web browser. Alternatively, a client device may encompass an application such as a database application (or user interface thereof), a media application, an office application, or any other application that may interact with the client interface 120 to perform various operations. In some embodiments, such an application may include sufficient protocol support (e.g., for a suitable version of Hypertext Transfer Protocol [HTTP]) for generating and processing network-based service requests without necessarily implementing full browser support for all types of network-based data. In some embodiments, client devices 110A-110N may be configured to generate network-based service requests according to a Representational State Transfer (REST)-style network-based services architecture, a document- or message-based network-based services architecture, or another suitable network-based services architecture. In some embodiments, one of the client devices 110A-110N may be configured with access to a virtual compute instance in the provider network 190 in a manner that is transparent to applications implement on the client device utilizing computational resources provided by the virtual compute instance. In at least some embodiments, client devices 110A-110N may provision, mount, and configure storage volumes implemented at storage services within the provider network 190 for file systems implemented at the client devices.

Client devices 110A-110N may convey network-based service requests to the compute environment management system network 100 via one or more networks. In various embodiments, the network(s) may encompass any suitable combination of networking hardware and protocols necessary to establish network-based communications between client devices 110A-110N and compute environment management system 100. For example, the network(s) may generally encompass the various telecommunications networks and service providers that collectively implement the Internet. The network(s) may also include private networks such as local area networks (LANs) or wide area networks (WANs) as well as public or private wireless networks. For example, both a given client device and the compute environment management system 100 may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the compute environment management system 100. It is noted that in some embodiments, client devices 110A-110N may communicate with compute environment management system 100 using a private network rather than the public Internet.

The provider network 190 may include a plurality of computing resources such as different pools of resources 191 through 195 through 199. The resources may include compute instances, storage instances, and so on. The resources offered by the provider network 190 may vary in their respective configurations. As used herein, the configuration of a computing resource may include its instance type, hardware capabilities (e.g., type and number of processor cores, type and number of virtual CPUs, type and amount of memory and storage, presence or absence of specialized coprocessors such as a graphics processing unit (GPU), presence or absence of particular application-specific integrated circuits (ASICs) or field-programmable gate arrays (FPGAs), and so on), software configuration (e.g., operating system type and configuration, virtualized execution environment type and configuration, application type and configuration, and so on), and/or other suitable characteristics. For example, the provider network may include a set of compute instances (physical compute instances and/or virtual compute instances) of different compute instance types, where the compute instance types may vary in the capabilities and features of their processor resources, memory resources, storage resources, network resources, and so on, and potentially in their cost as well. The configuration of a computing resource may impact the performance of that resource for executing a particular task, such that resources having different configurations may vary in performance (e.g., processor performance, execution time, memory usage, storage usage, network usage, energy usage, and so on) for the same or similar tasks. The resources offered by the provider network 190 may also vary in their respective costs that are assessed to clients for reserving and/or using the resources. In one embodiment, the costs may vary by hardware configuration as well as by purchasing mode. Additionally, the resources offered by the provider network 190 may vary in their availability at particular times.

When not in use by clients, the computing resources may belong to various pools of available computing resources 191, 195, and 199. The resource manager 180 may reserve and provision individual ones of the resources for individual clients. The resource manager 180 may also deprovision individual ones of the resources and return them to the pool of available resources of the provider network 190. Any suitable number and configuration of computing resources may be used to execute jobs in a compute environment managed by the compute environment management system 100. The provider network 190 may include additional components not shown, fewer components than shown, or different combinations, configurations, or quantities of the components shown.

The provider network 190 may include a network set up by an entity such as a company or a public sector organization to provide one or more services (such as various types of network-accessible computing or storage) accessible via the Internet and/or other networks to a distributed set of clients. The provider network 190 may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network 190 in different embodiments, including general purpose or special purpose computer servers, storage devices, network devices, and the like. Because resources of the provider network 190 may be under the control of multiple clients (or tenants) simultaneously, the provider network may be said to offer multi-tenancy and may be termed a multi-tenant provider network. For example, virtual compute instances in a multi-tenant provider network 190 may be concurrently used for the processing of jobs by client 110A as well as by client 110B.

In some embodiments, an operator of the provider network 190 may implement a flexible set of resource reservation, control, and access interfaces for their clients. For example, the resource manager 180 may implement a programmatic resource reservation interface (e.g., via a web site or a set of web pages) that allows clients and/or other components such as the system 100 to learn about, select, purchase access to, and/or reserve compute instances offered by the provider network 190. Such an interface may include capabilities to allow browsing of a resource catalog and provide details and specifications of the different types or sizes of resources supported, the different reservation types or modes supported, pricing models, and so on. The provider network 190 may support several different purchasing modes (which may also be referred to herein as reservation modes) in various embodiments: for example, long-term reservations, on-demand resource allocation, or spot-price-based resource allocation.

Using the long-term reservation mode, a client may make a low, one-time, upfront payment for a resource instance, reserve it for a specified duration such as a one-year or three-year term, and pay a low hourly rate for the instance; the client may be assured of having the reserved instance available for the term of the reservation. Using the on-demand mode, a client could pay for capacity by the hour (or some appropriate time unit), without any long-term commitments or upfront payments. In the spot-price mode, a client could specify the maximum price per unit time that it is willing to pay for a particular type of resource, and if the client's maximum price exceeded a dynamic spot price determined at least in part by supply and demand, that type of resource would be provided to the client. In some embodiments, dynamically resizable pools of resource instances may be set aside for the different reservation types or modes: e.g., long-term reserved instances may be allocated from one pool, on-demand instances from another, and so on. During periods when the supply of the requested resource type exceeds the demand, the spot price may become significantly lower than the price for on-demand mode. In some implementations, if the spot price increases beyond the maximum bid specified by a client, a resource allocation may be interrupted: e.g., a resource instance that was previously allocated to the client may be reclaimed by the resource manager 180 and may be allocated to some other client that is willing to pay a higher price. Other purchasing modes or combinations of modes may be implemented by the resource manager 180 in some embodiments.

In one embodiment, the provider network 190 may offer virtual compute instances with varying computational and/or memory resources. In one embodiment, each of the virtual compute instances may correspond to one of several instance types. An instance type may be characterized by its computational resources (e.g., number, type, and configuration of central processing units [CPUs] or CPU cores, including virtual CPUs), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using the resource manager 180, an instance type may be selected for a job, e.g., based (at least in part) on input from the client. For example, a client may choose an instance type from a predefined set of instance types. As another example, a client may specify the desired resources of an instance type for a job (e.g., in the job definition), and the resource manager 180 may select an instance type based on such a specification.

Virtual compute instance configurations may also include virtual compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Configurations of virtual compute instances may also include their location in a particular data center or availability zone, geographic location, and (in the case of reserved compute instances) reservation term length.

The compute environment management system 100 may automatically manage the provisioning and deprovisioning of scheduled reserved compute instances on behalf of clients, e.g., such that scheduled reserved instances are automatically added to or removed from particular compute environments at appropriate times. Scheduled reserved instances may include computing resources (e.g., compute instances) that are accessible by or on behalf of a client for a particular period of time, e.g., based on a reservation. In one embodiment, the computing resources associated with such a reservation may be exclusively used by a particular client and not by other clients during the period of time. The compute environment management system 100 may automatically manage job queues associated with scheduled reserved compute instances and their compute environments, e.g., such that clients may add jobs to the queues before and/or during the windows of time associated with the scheduled reserved instances.

Figure 10:
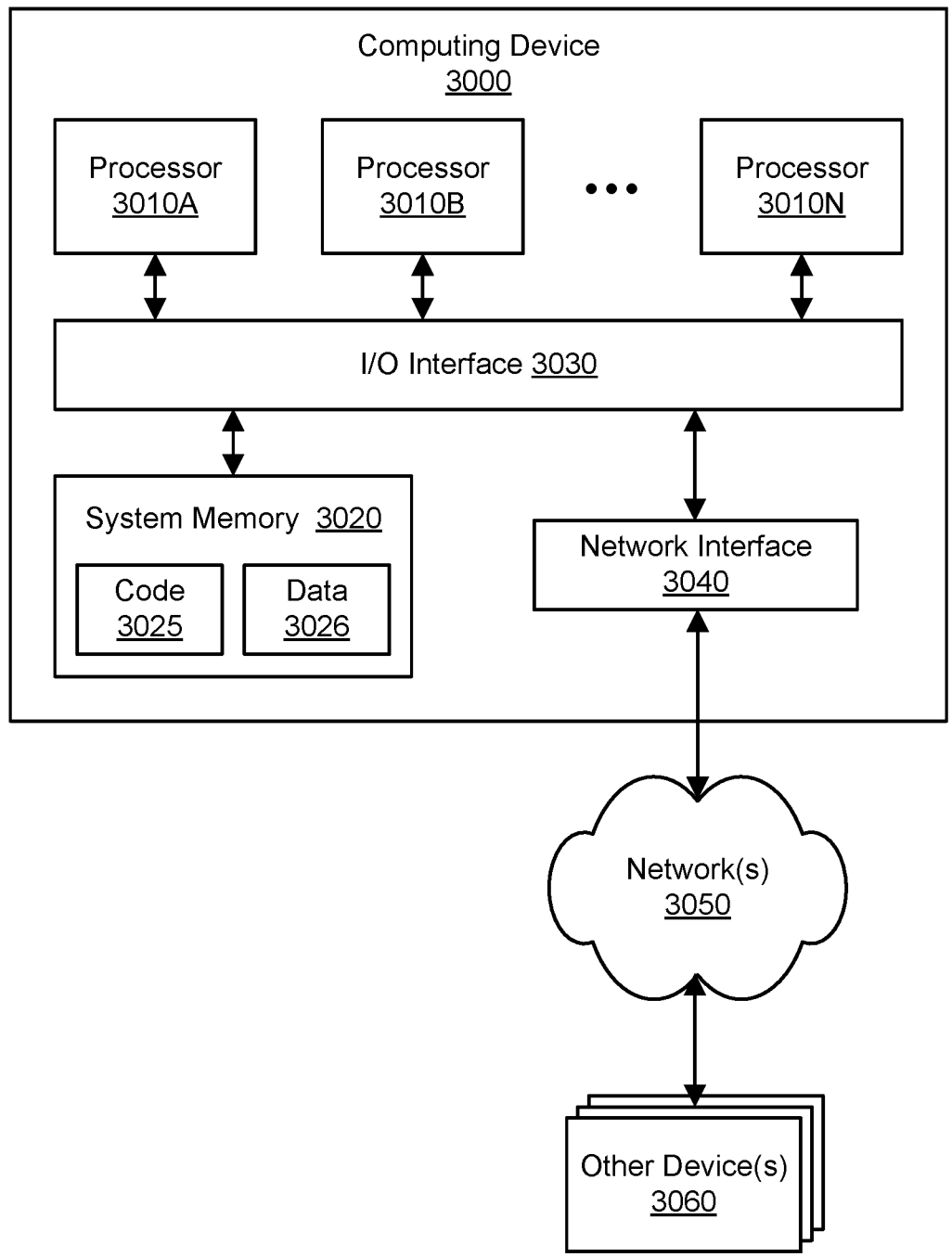
FIG. 10 illustrates an example computing device that may be used in some embodiments.

The compute environment management system 100 may include a plurality of computing devices, any of which may be implemented by the example computing device 3000 illustrated in FIG. 10. In various embodiments, portions of the described functionality of the compute environment management system 100 may be provided by the same computing device or by any suitable number of different computing devices. If any of the components of the compute environment management system 100 are implemented using different computing devices, then the components and their respective computing devices may be communicatively coupled, e.g., via a network. Each of the illustrated components may represent any combination of software and hardware usable to perform their respective functions. It is contemplated that the compute environment management system 100 may include additional components not shown, fewer components than shown, or different combinations, configurations, or quantities of the components shown.

Figure 2:
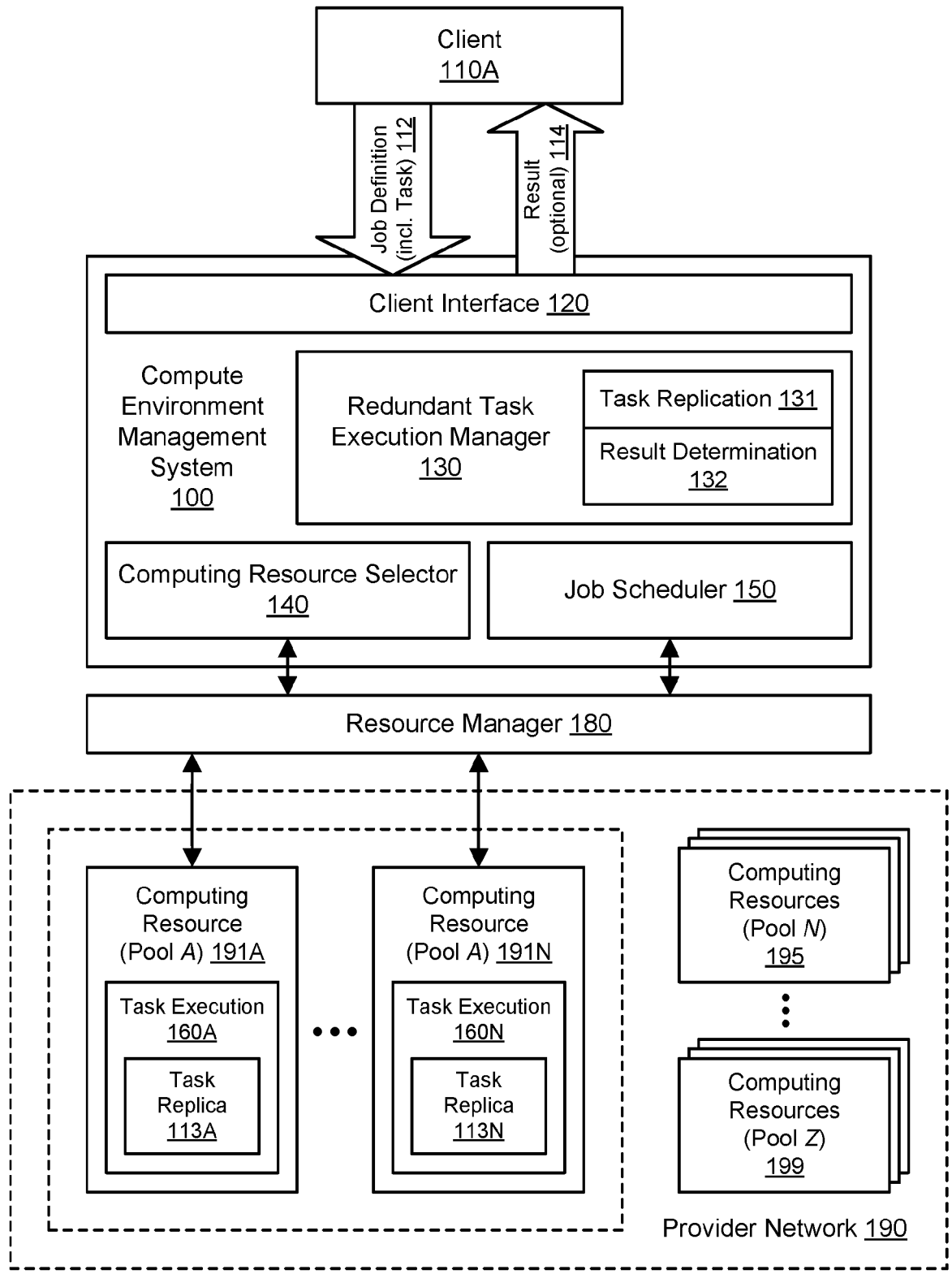
FIG. 2 illustrates further aspects of the example system environment for execution of replicated tasks using redundant resources, including the use of computing resources from a selected resource pool, according to one embodiment.

FIG. 2 illustrates further aspects of the example system environment for execution of replicated tasks using redundant resources, including the use of computing resources from a selected resource pool, according to one embodiment. The client 110A may provide a job definition 112 to the compute environment management system 100. As discussed above, the job definition 112 may specify or reference one or more tasks to be performed by computing resources in the provider network. The tasks within a job definition may include entirely different tasks (e.g., tasks having different program code) and/or tasks that run the same program code for different input data. For a particular task, the job definition 112 may include or reference program instructions to be executed in processing the task. The job definition may also indicate anticipated resource usage or resource requirements, such as one or more values (including a range of values) for anticipated processor usage, memory usage, storage usage, network usage, and/or other hardware resource characteristics. In some embodiments, the job definition may indicate, for one or more tasks, the anticipated or required hardware capabilities (e.g., type and number of processor cores, type and number of virtual CPUs, type and amount of memory and storage, presence or absence of specialized coprocessors such as a graphics processing unit (GPU), presence or absence of particular application-specific integrated circuits (ASICs) or field-programmable gate arrays (FPGAs), and so on), software configuration (e.g., operating system type and configuration, virtualized execution environment type and configuration, application type and configuration, and so on), and/or other suitable characteristics. The job definition 112 may be intended to be executed either without delay or at a future point in time, e.g., based on a client-specified schedule.

The redundant task execution manager 130 may include various components, such as a task replication component 131 and a result determination component 132. The task replication 131 may generate multiple replicas of a task indicated in the job definition 112. The replicas, such as replicas 113A through 113N, may include the same program code or instructions (or a reference thereto) and may operate on the same set of input data from replica to replica. In one embodiment, each replica of a particular task may use the same input data rather than using different partitions of a set of data. The replicas may also be referred to as copies or instances of the task. The task may represent a compute task that, when successfully executed, produces a result. The task may be idempotent: even when executed multiple times (either concurrently or in series) with the same input data, the task may produce the same result each time (unless an error occurs during execution). Suitable tasks for use with the task replication 131 may include idempotent tasks whose results are needed by the client by a specified point in time (also referred to as a need-by time or deadline). For example, a financial-services client may require that a financial calculation be completed by a specified time each business day. As another example, a weather-forecasting client may require that a weather-forecasting task be completed by a specified time each day. In one embodiment, the task replication 131 may be performed with prior approval by the client 110A who submitted the job definition 112. In one embodiment, the task replication 131 may be performed automatically and without a need for prior approval by the client 110A who submitted the job definition 112. In one embodiment, the task replication and concurrent execution may be performed without the client 110A necessarily directing or being aware of the replication and concurrent execution. In various embodiments, the number of replicas (and the corresponding number of redundant computing resources) may be determined based (at least in part) on a client-specified number (or range of numbers) or a client-specified budget, e.g., as associated with the task. In one embodiment, the number of replicas (and the corresponding number of redundant computing resources) may be determined based (at least in part) on a default value, e.g., without input from the client indicating the number of replicas. In one embodiment, the number of replicas (and the corresponding number of redundant computing resources) may be determined based (at least in part) on analysis of performance metrics, e.g., of the same or similar jobs such that a need-by time is likely to be met.

Computing resources from at least one pool may be selected from the provider network 190 for execution of the task replicas, e.g., by one or more components such as the computing resource selector 140. As shown in the example of FIG. 2, a set of computing resources 191A-191N from the pool A may be selected for concurrent execution of the task replicas. Resources from other pools, such as resources 195 and 199, may not be used for concurrent execution of the replicas of this particular task. Any suitable number and configuration of computing resources may be used for concurrent execution of the task replicas. The selected computing resources 191A-191N may be provisioned from the provider network 190 (e.g., using a component such as a resource manager 180) and placed in one or more compute environments associated with the client. In one embodiment, the resources 191A-191N may be selected based on an execution characteristic such as an interruptibility characteristic (e.g., the resources include compute instances purchased from a spot market and are thus subject to interruption) and/or a reliability characteristic (e.g., the resources are less reliable on an individual basis and thus less likely to produce individual results than other, non-selected resources). In one embodiment, the selected resources 191A-191N may be associated with a lower cost per compute time than resources 195 and/or 199. In one embodiment, the computing resources may be selected based (at least in part) on a client-specified budget, e.g., as associated with the task.

In one embodiment, the resources 191A-191N may be selected based (at least in part) on input from the client, such as a list of instance type identifiers that are usable within a compute environment or a list of instance types on which a task may be executed. In one embodiment, the resources 191A-191N may be selected without input from a client, e.g., automatically and/or programmatically by one or more components of the compute environment management system 100. Particular resources or resource configurations may be selected based on job definitions. For example, if a job definition indicates that a particular number of virtual CPUs is required for a task, or a particular amount of memory is required, then only computing resources that meet or exceed such requirements may be selected in one embodiment. In one embodiment, the hardware configuration may be the same or similar for the resources 191A-191N.

Execution of the replicas of the task may be initiated using the computing resources 191A-190N. The resources may be configured for task execution, e.g., the resource 191A may include one or more components 160A for execution of a task replica 113A while the resource 191N may include one or more components 160N for execution of a task replica 113N. The task execution components 160A-160N may operate concurrently or in parallel, such that execution of at least some of the task replicas may overlap (at least partially) in time. However, execution of the various replicas 113A-113N may complete at different times using different resources, or some of the replicas may fail to complete successfully. As discussed above, although the selected resources 191A-191N may individually be interruptible or less reliable, the concurrent use of multiple resources to execute replicas 113A-113N may collectively be more reliable, less costly, and/or quicker to generate a single result (from at least one instance in the array) than using a single instance of a more expensive type (e.g., resources 195 and/or 199).

Initiating the concurrent execution of task replicas may include the compute environment management system 100 interacting with a resource manager 180 to provision, configure, and launch one or more compute instances to run the task replicas. Provisioning a resource may include reserving, configuring, and/or launching the resource. In a multi-tenant provider network 190, a compute instance may represent a virtual compute instance running on a physical compute instance, and the physical compute instance may be selected from a set of different instance types having different configurations or capabilities and potentially a different fee structure for usage. Each instance may be used for one or more tasks in the workload and then deprovisioned or reconfigured for use by the same client. In one embodiment, a container management system may be used with the virtual compute instances to deploy the program instructions supplied or otherwise referenced by the client. For example, the provisioned instance may be launched using a machine image that includes a container management system. In various embodiments, the instance may be launched before the task is scheduled or in response to the scheduling of the job. After launch, a container may be filled with the program instructions indicated by the client for performing the task. In one embodiment, tasks may also represent programs (and potentially input data) submitted to a program execution service that manages its own fleet of compute instances. In one embodiment, the task execution 160A-160N may be configured for tasks associated with batch applications. In one embodiment, the task execution 160A-160N may be configured for web applications, microservice applications, and/or services running on top of an environment such as a container service.

In one embodiment, the task replicas that successfully complete their execution may generate individual results. If similar hardware platforms are used for the concurrent task execution, then the results may generally be deterministic and may not vary from replica to replica. In one embodiment, the individual results may be collected or marshaled by the result determination component 132, and a single "final" result may optionally be returned to the client 110A. In one embodiment, the final result 114 may be determined as the individual result of the first task replica to successfully complete. In one embodiment, the execution of other replicas may be terminated prematurely once the first result is generated. In one embodiment, the final result 114 may be determined by agreement of more than one task replica to successfully complete, e.g., to validate the first result of one replica with subsequent results of other replicas. In one embodiment, the manner of determining the final result may optimize for one or more goals. For example, if the goal is to generate a result as quickly as possible, then the first individual result to be generated may be returned as the final result 114. As another example, if the goal is to generate a reliable result but time is less important, then multiple individual results of the replicas 113A-113N (but not necessarily all) may be collected, analyzed, and/or validated to produce a reliable final result 114. The goal(s) may be specified by the client 110A or otherwise determined by the redundant task execution manager 130. As used herein, terms such as "optimization," "optimize," "optimized," and "optimal" generally refer to a process of improvement in one or more characteristics and not necessarily to reaching a perfect or ideal state.

Figure 3:
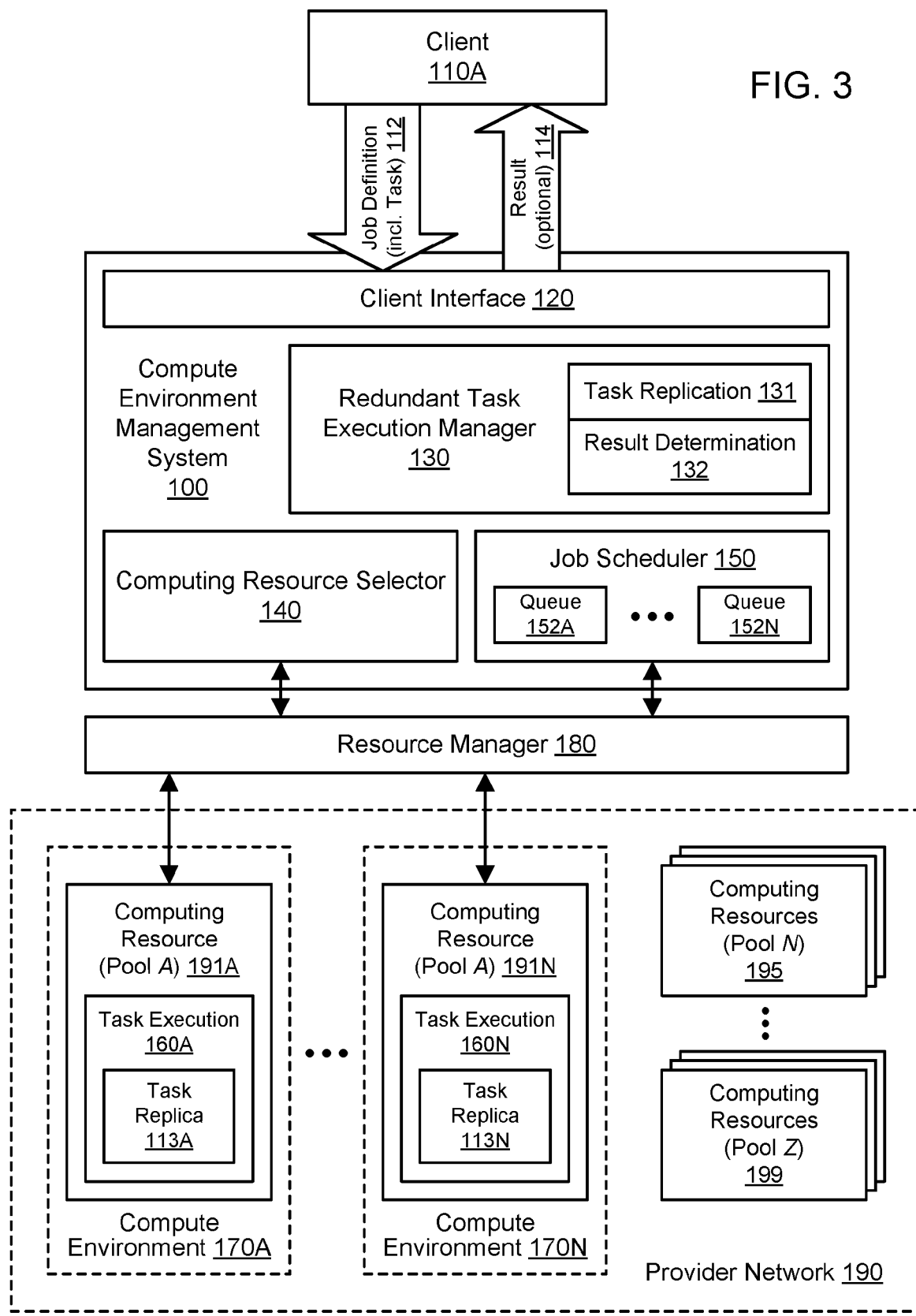
FIG. 3 illustrates further aspects of the example system environment for execution of replicated tasks using redundant resources, including the use of computing resources in different compute environments mapped to different queues, according to one embodiment.

FIG. 3 illustrates further aspects of the example system environment for execution of replicated tasks using redundant resources, including the use of computing resources in different compute environments mapped to different queues, according to one embodiment. In one embodiment, the selected resources 191A-191N may be deployed in a single compute environment associated with the client 110A. In one embodiment, as shown in the example of FIG. 3, the selected resources 191A-191N may be deployed in a plurality of compute environments associated with the client 110A, such as compute environments 170A through 170N. Any of the compute environments 170A-170N may include any suitable number of the selected computing resources. The job scheduler 150 may implement queues 152A-152N associated with queue identifier(s) provided by a client and mapped to particular compute environments. For example, queue 152A may be mapped to compute environment 170A, and queue 152N may be mapped to compute environment 170N. The task replicas may be enqueued in the appropriate queues in a concurrent or parallel manner. For example, task replica 113A may be enqueued in job queue 152A for attempted execution in compute environment 170A, and concurrently task replica 113N may be enqueued in job queue 152N for attempted execution in compute environment 170N. If the resources 191A-191N vary in configuration, then in one embodiment, each type of resource configuration may be isolated in its own compute environment. However, it is also contemplated that a compute environment may include more than one type of resource configuration, e.g., compute instances of more than one instance type. In one embodiment, the different compute environments 170A-170N may represent different compute providers.

Figure 4:
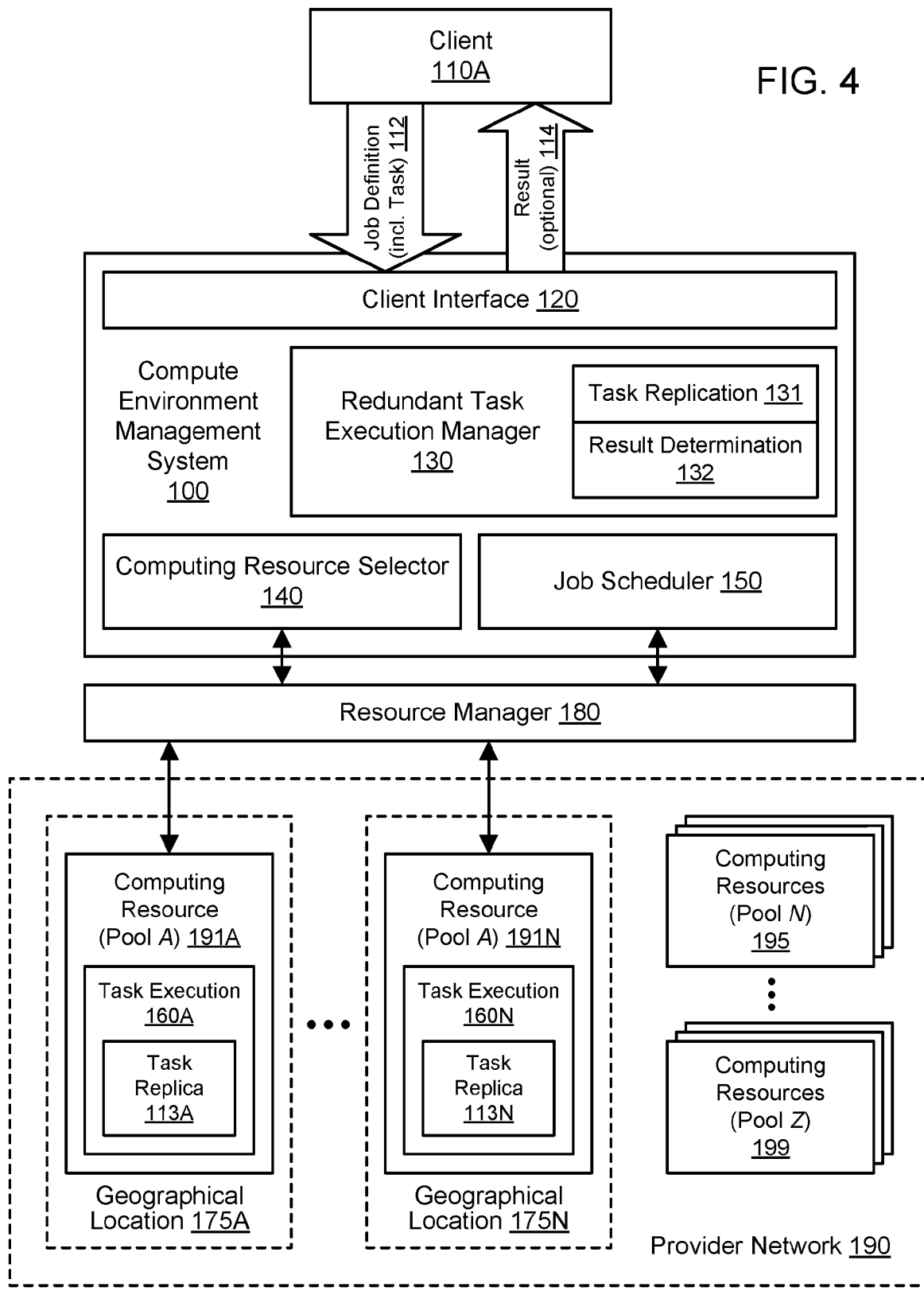
FIG. 4 illustrates further aspects of the example system environment for execution of replicated tasks using redundant resources, including the use of computing resources in different geographical locations, according to one embodiment.

FIG. 4 illustrates further aspects of the example system environment for execution of replicated tasks using redundant resources, including the use of computing resources in different geographical locations, according to one embodiment. In one embodiment, the selected resources 191A-191N may be deployed in a single geographical location or availability zone. In one embodiment, as shown in the example of FIG. 4, the selected resources 191A-191N may be deployed in a plurality of geographical locations, such as locations 175A through 175N. Any of the locations 175A-175N may include any suitable number of the selected computing resources. The locations 175A-175N may represent different data centers, different nations or states, different continents or regions, different availability zones as configured by the operator of the provider network 190, and other suitable geographical or political divisions. In one embodiment, the different locations 175A-175N may vary in network locality in the provider network 190. Deployment to a variety of locations may tend to achieve a greater reliability across the array of redundant resources 191A-191N, such that a zone-wide or location-wide failure may not prevent the array from generating at least one suitable individual result of the concurrent execution of the task replicas.

Figure 5:
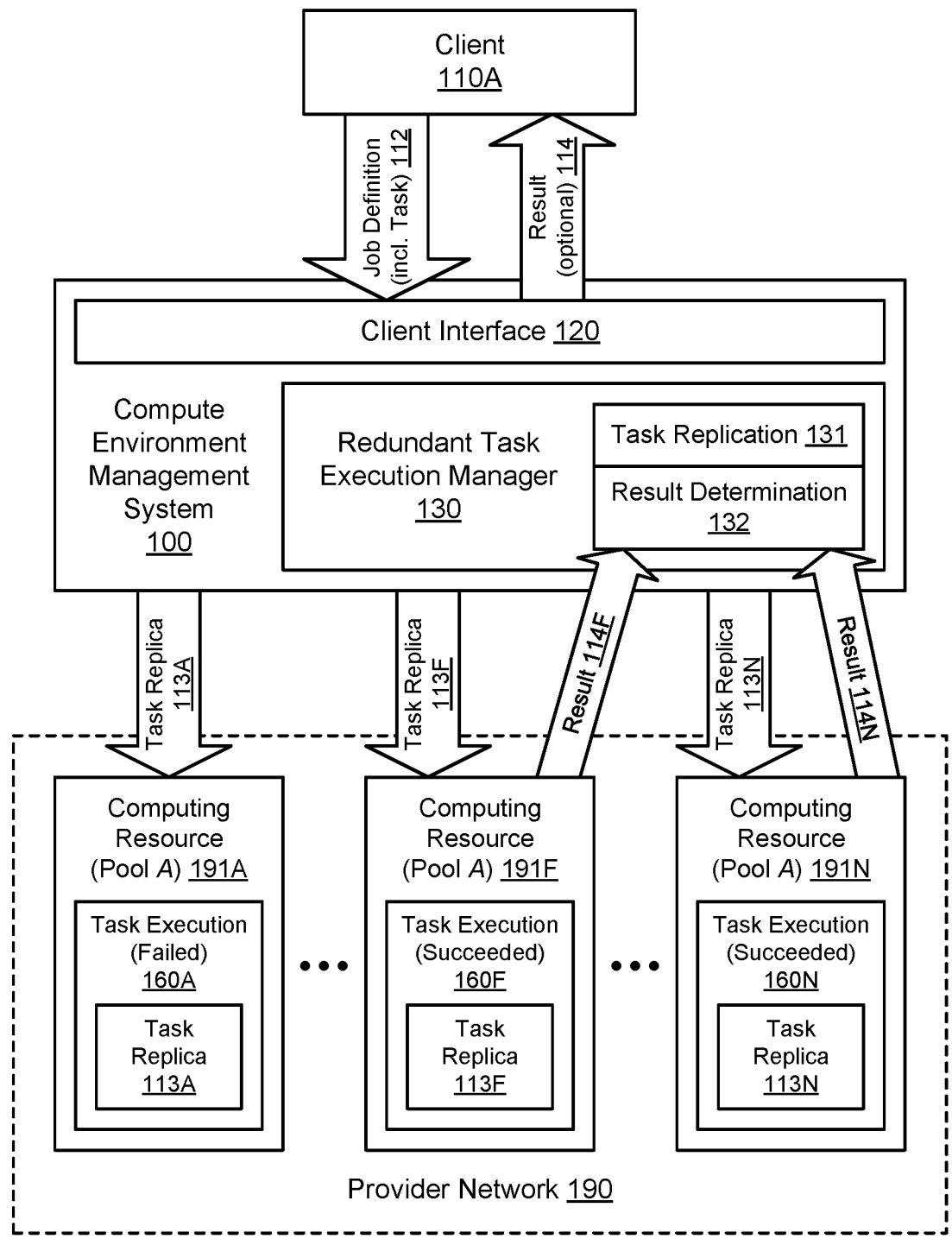
FIG. 5 illustrates further aspects of the example system environment for execution of replicated tasks using redundant resources, including the determination of a result when one or more replicas fail to execute successfully, according to one embodiment.

FIG. 5 illustrates further aspects of the example system environment for execution of replicated tasks using redundant resources, including the determination of a result when one or more replicas fail to execute successfully, according to one embodiment. As discussed above, the task replicas that successfully complete their execution may generate individual results. If similar hardware platforms are used for the concurrent task execution, then the results may generally be deterministic and may not vary from replica to replica. However, different hardware platforms may be used for some of the resources 191A-191N than for others, and results may vary from replica to replica in such circumstances (e.g., if numerical precision varies across resources for some data types). Additionally, some of the resources may fail to execute a replica successfully due to hardware, software, and or network error.

As shown in the example of FIG. 5, the task execution 160A on resource 191A has failed (and has not produced an individual result), while the task execution 191F and the task execution 191N have succeeded in generating individual results 114F and 114N. In one embodiment, the individual results 114F and 114N may be collected or marshaled by the result determination component 132, and a single "final" result may optionally be returned to the client 110A. In one embodiment, the final result 114 may be determined as the individual result 114F or 114N of the first task replica 113F or 113N to successfully complete. In one embodiment, the execution of other replicas may be terminated prematurely once the first result is generated. In one embodiment, the final result 114 may be determined by agreement of more than one task replica to successfully complete, e.g., to validate the first result of one replica with subsequent results of other replicas.

In one embodiment, the manner of determining the final result may optimize for one or more goals. For example, if the goal is to generate a result as quickly as possible, then the earliest individual result 114F or 114N may be returned as the final result 114. As another example, if the goal is to generate a reliable result but time is less important, then multiple individual results 114F and 114N of the replicas 113A-113N (but not necessarily all) may be collected, analyzed, and/or validated to produce a reliable final result 114. The goal(s) may be specified by the client 110A or otherwise determined by the redundant task execution manager 130.

Figure 6:
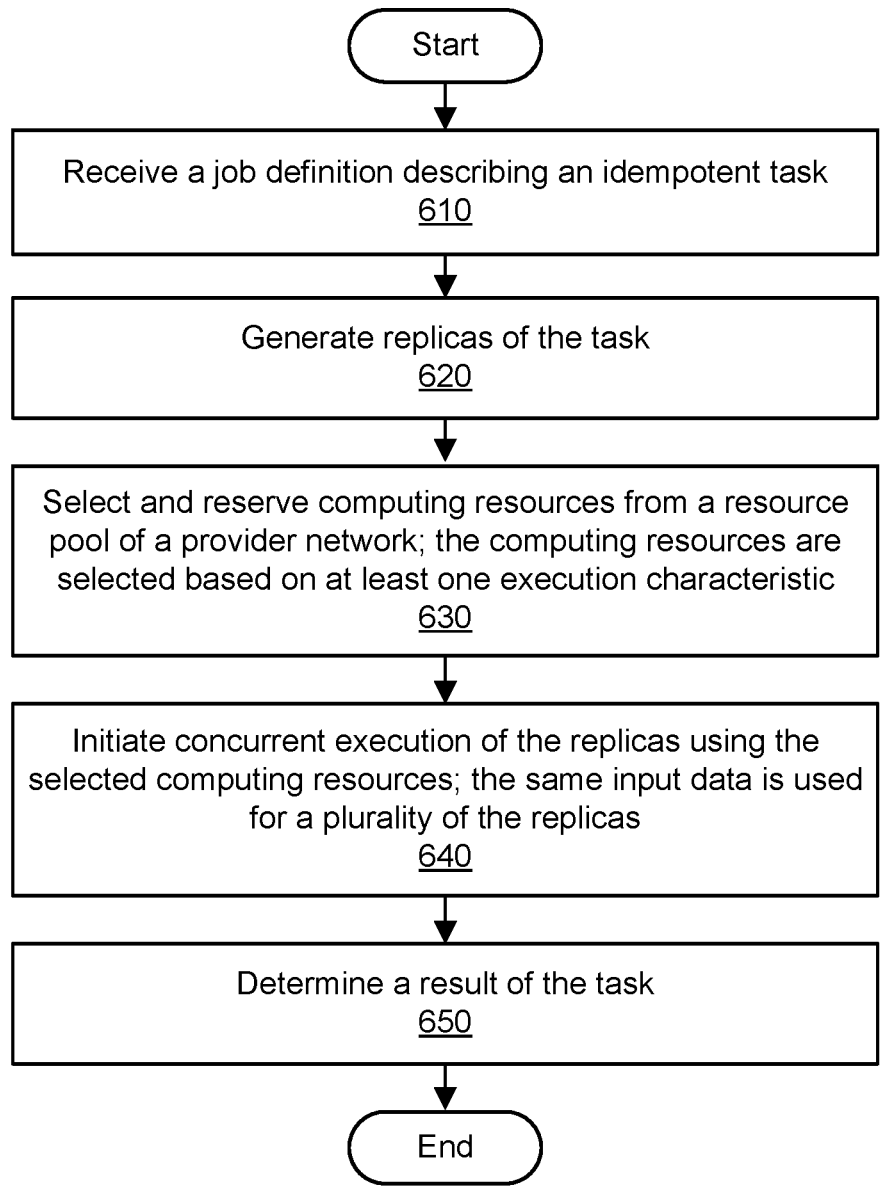
FIG. 6 is a flowchart illustrating a method for execution of replicated tasks using redundant resources, according to one embodiment.

FIG. 6 is a flowchart illustrating a method for execution of replicated tasks using redundant resources, according to one embodiment. Various ones of the operations shown in FIG. 6 may be performed (at least in part) or otherwise orchestrated by a compute environment management system. However, the compute environment management system may interact with other components, such as a client computing device and components of a provider network (potentially including a resource manager and a plurality of computing resources). As shown in 610, a job definition may be received, e.g., from a client by the compute environment management system. The job definition may specify or reference a compute task and input data for the task. For a particular task, a job definition may include or reference program instructions to be executed in processing the task. The job definition may also include or be provided with other suitable metadata, including timing information (e.g., a time to begin processing the workload, an anticipated time to run the workload, and/or a deadline), budgetary information, anticipated resource usage, and so on. For example, the anticipated resource usage in a job definition may indicate one or more values (including a range of values) for recommended or required processor usage (e.g., a number of virtual CPUs), memory usage, storage usage, network usage, and/or other hardware resource characteristics.

As shown in 620, replicas of the task may be generated. The replicas may include or reference the same program code or instructions. The replicas may operate on the same set of input data from replica to replica. In one embodiment, each replica of a particular task may use the same input data rather than using different partitions of a set of data. The task may be idempotent such that it may produce the same result if executed more than once with the same input data. In one embodiment, the task replication may be performed automatically and without a need for prior approval by the client who submitted the job definition. In one embodiment, the task replication and concurrent execution may be performed without the client necessarily directing or being aware of the replication and concurrent execution.

As shown in 630, computing resources may be selected and reserved from at least one resource pool of the provider network for use in executing the task replicas. The provider network may include a plurality of resource pools, and the resources in the different pools may vary in one or more characteristics that are relevant to the execution of replicated tasks using redundant resources. In one embodiment, the resources may vary in an execution characteristic associated with the interruptibility or reliability of task execution using an individual resource. The selected resources may typically be more interruptible and/or less reliable than other resources offered by the provider network. The execution characteristic may vary according to the purchasing modes associated with various pools of resources. For example, the selected compute instances may be reserved from a less expensive spot market (in which an instance reservation may not be guaranteed to be maintained, e.g., if a higher bid is received) instead of a more expensive on-demand market (in which an instance reservation may be guaranteed for an agreed-upon duration). Although the selected instances may individually be interruptible or less reliable, the concurrent use of multiple instances may collectively be more reliable, less costly, and/or quicker to generate a single result (from at least one instance in the array) than using a single instance of a more expensive type. If the cost per instance of the selected pool (e.g., a pool of spot instances) is sufficiently less than the cost per instance of another pool (e.g., a pool of on-demand instances), then the use of multiple instances from the selected pool may be less costly or the same cost to produce a result of a task than if the more expensive pool were used.

The selected computing resources may be deployed in the same or different compute environments or geographical locations. The selected computing resources may be provisioned from the provider network (e.g., using a component such as a resource manager) and placed in one or more compute environments associated with the client. In one embodiment, the particular configurations may be selected without input from a client, e.g., automatically and/or programmatically by one or more components of the compute environment management system. Particular configurations may be selected based on job definitions. For example, if a job definition indicates that a particular number of virtual CPUs is required for a task, or a particular amount of memory is required, then only computing resources that meet or exceed such requirements may be selected in one embodiment.

As shown in 640, concurrent execution of the task replicas using the selected computing resources may be initiated. In one embodiment, the same input data may be used for a plurality of the replicas, e.g., such that each of the replicas may operate on substantially identical input data rather than different input data (or a different portion of the same input data). The task execution may be performed concurrently or in parallel, such that execution of at least some of the task replicas may overlap (at least partially) in time. At least some of the replicas may produce individual results for the input data. However, execution of the various replicas may complete (and produce individual results) at different times using different resources, or some of the replicas may fail to complete successfully. Initiating the execution of a replica of the task may include the compute environment management system interacting with a resource manager to provision, configure, and launch a plurality of computing resources (such as compute instances) to run the task. Provisioning a resource may include reserving, configuring, and/or launching the resource. In a multi-tenant provider network, a compute instance may represent a virtual compute instance running on a physical compute instance, and the physical compute instance may be selected from a set of different instance types having different configurations or capabilities and potentially a different fee structure for usage. Each instance may be used for one or more tasks in a workload and then deprovisioned or reconfigured for use by the same client.

As shown in 650, a result of the task may be determined. The result may be determined based (at least in part) on the concurrent execution of the replicas using the selected computing resources. In one embodiment, the task replicas that successfully complete their execution may generate individual results. If similar hardware platforms are used for the concurrent task execution, then the results may generally be deterministic and may not vary from replica to replica. In one embodiment, the individual results may be collected or marshaled by a centralized component, and a single "final" result may be determined and potentially returned to the client. The final result may be determined by selecting one or more of the individual results of the replicas. In one embodiment, the final result may be selected from among the individual results based on a policy, and the policy may be applied programmatically (e.g., by execution of program instructions) and/or automatically (e.g., without necessarily requiring user input beyond an initial configuration stage). In one embodiment, the policy may include taking the first individual result, and the final result may be determined as the individual result of the first task replica to successfully complete. In one embodiment, the execution of other replicas may be terminated prematurely once the first result is generated. In one embodiment, the policy may include looking for a quorum of individual results or an agreement among individual results, and the final result may be determined by agreement of more than one task replica to successfully complete, e.g., to validate the first result of one replica with subsequent results of other replicas. In one embodiment, the manner of determining the final result may optimize for one or more goals. For example, if the goal is to generate a result as quickly as possible, then the first individual result to be generated may be returned as the final result. As another example, if the goal is to generate a reliable result but time is less important, then multiple individual results of the replicas (but not necessarily all) may be collected, analyzed, and/or validated to produce a reliable final result.

In one embodiment, a compute instance or other resource may be automatically deprovisioned and/or returned to a pool of available computing resources upon completion (e.g., successful or unsuccessful termination) of the task replica or otherwise when the compute environment management system determines that the instance is no longer needed in a compute environment. Deprovisioning may include terminating and returning the compute instance to a pool of available resources of a provider network, e.g., as managed by the resource manager. Deprovisioned instances may be used in the future by the same client or by one or more different clients. In one embodiment, compute instances may be deprovisioned and/or removed automatically (e.g., without direct input from a user) and programmatically (e.g., by execution of program instructions) by the compute environment management system.

Figure 7:
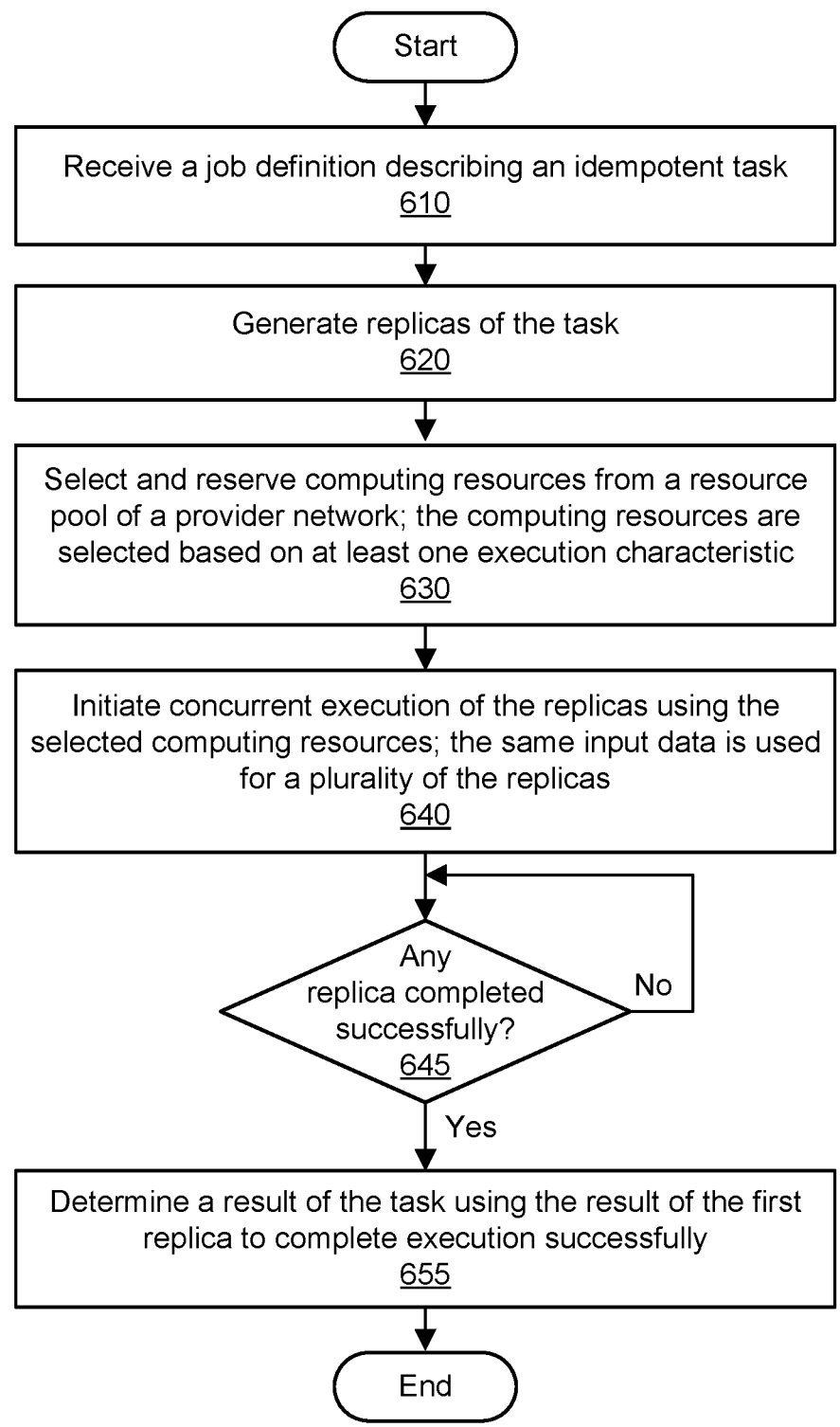
FIG. 7 is a flowchart illustrating further aspects of the method for execution of replicated tasks using redundant resources, including taking the result of the first replica to complete execution successfully, according to one embodiment.

FIG. 7 is a flowchart illustrating further aspects of the method for execution of replicated tasks using redundant resources, including taking the result of the first replica to complete execution successfully, according to one embodiment. The operations shown in 610, 620, 630, and 640 may be performed as discussed above with reference to FIG. 6. As also discussed above with respect FIG. 6, a result of the task may be determined based (at least in part) on the concurrent execution of the replicas using the selected computing resources. In one embodiment, the task replicas that successfully complete their execution may generate individual results. As shown in 645, the method may wait until a replica has successfully completed execution and generated an individual result. After the first individual result is generated, as shown in 655, the overall result of the task may be determined using the result of the first replica to complete execution successfully. In one embodiment, execution of the remaining replicas may be terminated prematurely once the first result is generated. In one embodiment, this manner of determining the final result may be implemented in order to optimize for one or more goals. For example, if the goal is to generate a result as quickly as possible, then the first individual result to be generated may be returned as the final result.

Figure 8:
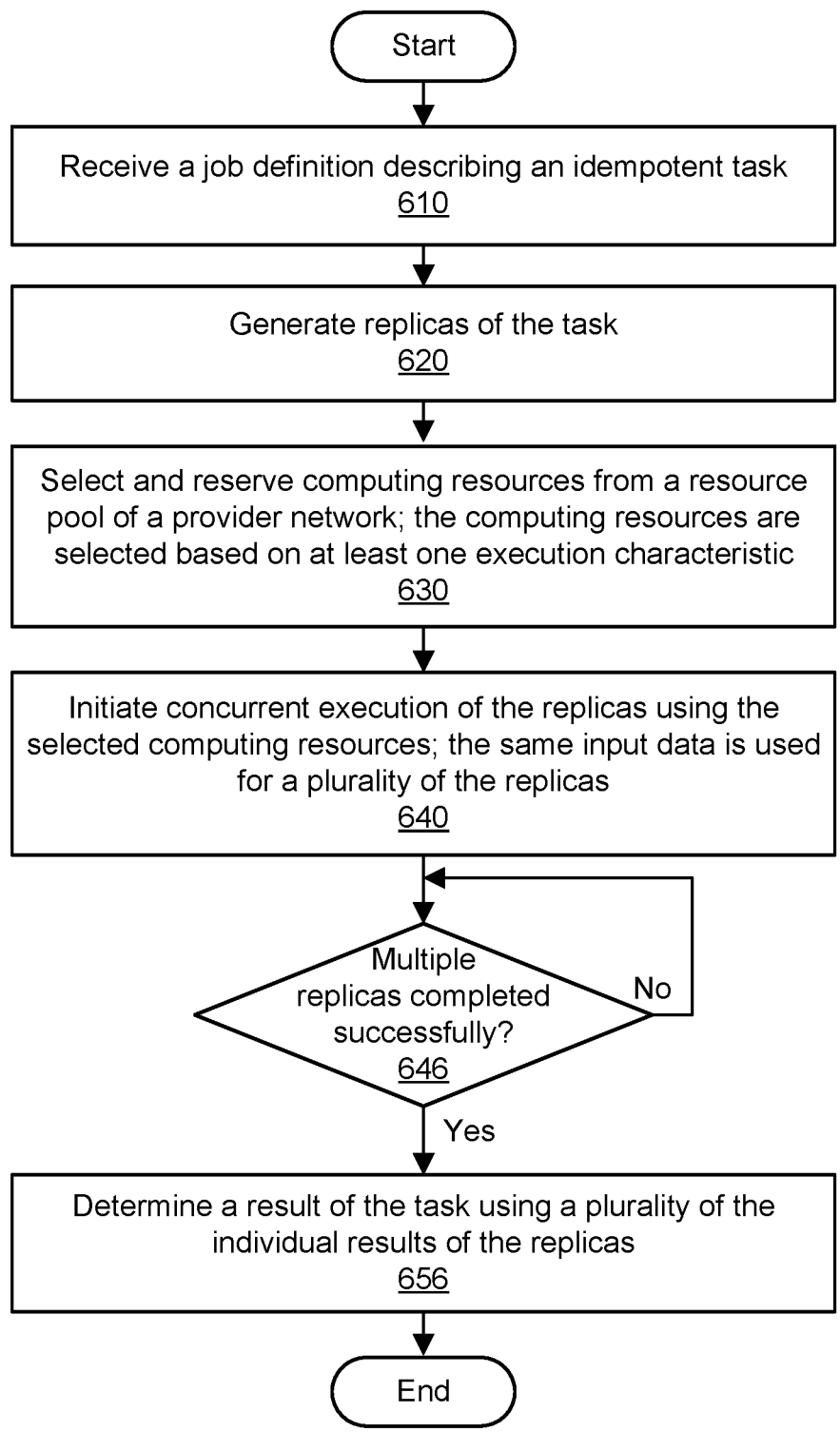
FIG. 8 is a flowchart illustrating further aspects of the method for execution of replicated tasks using redundant resources, including waiting for a plurality of replicas to complete execution successfully before determining the result, according to one embodiment.

FIG. 8 is a flowchart illustrating further aspects of the method for execution of replicated tasks using redundant resources, including waiting for a plurality of replicas to complete execution successfully before determining the result, according to one embodiment. The operations shown in 610, 620, 630, and 640 may be performed as discussed above with reference to FIG. 6. As also discussed above with respect FIG. 6, a result of the task may be determined based (at least in part) on the concurrent execution of the replicas using the selected computing resources. In one embodiment, the task replicas that successfully complete their execution may generate individual results. As shown in 646, the method may wait until multiple replicas of the task have successfully completed execution and generated individual results. In one embodiment, the operation shown in 646 may wait until all the replicas of the task have exited, either successfully or unsuccessfully. In one embodiment, the operation shown in 646 may wait until a sufficient number of the replicas have exited, either successfully or unsuccessfully. The required number of replicas or percentage of the total number of replicas may be configured according to any suitable goals. After a sufficient number of individual results are generated, then as shown in 656, the overall result of the task may be determined using the individual results of the replicas that completed execution successfully. In one embodiment, the final result may be determined by agreement of more than one task replica to successfully complete, e.g., to validate the first result of one replica with subsequent results of other replicas. In one embodiment, this manner of determining the final result may be implemented in order to optimize for one or more goals. For example, if the goal is to generate a reliable result but time is less important, then multiple individual results of the replicas (but not necessarily all) may be collected, analyzed, and/or validated to produce a reliable final result.

Figure 9:
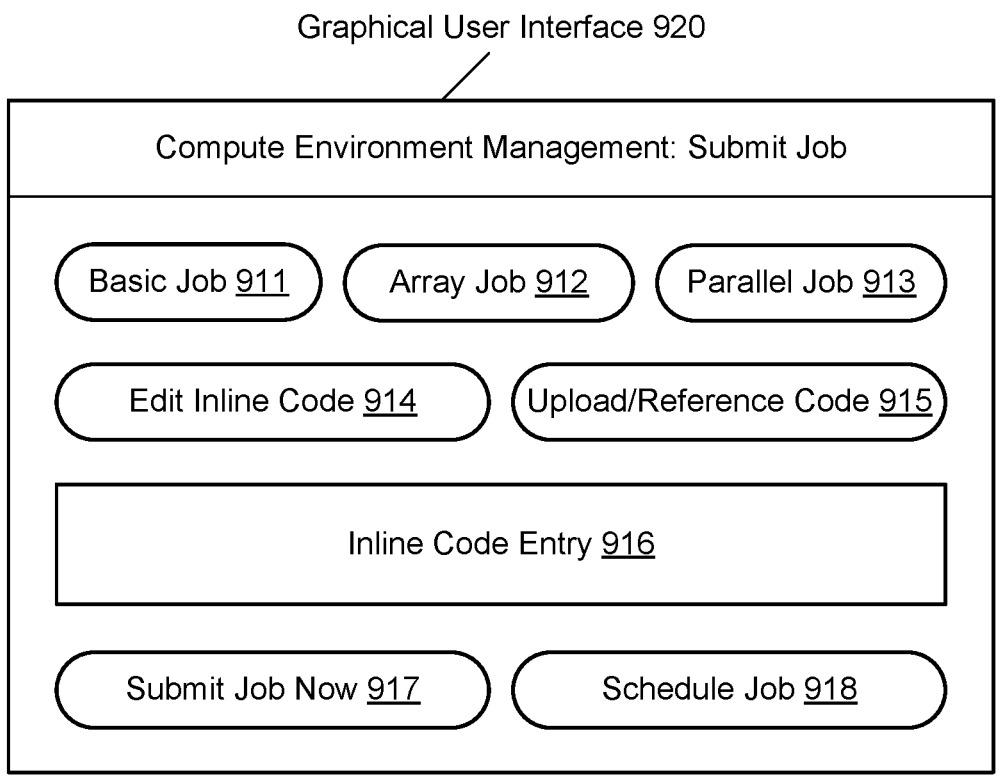
FIG. 9 illustrates an example of a graphical user interface for submitting a job to a compute environment, according to one embodiment.

FIG. 9 illustrates an example of a graphical user interface for submitting a job to a compute environment, according to one embodiment. The compute environment management system 100 may permit a user to submit jobs to be executed in a compute environment. To submit a job to a compute environment, the user may interact with one or more interfaces of the compute environment management system 100, such as an application programming interface (API), command-line interface (CLI), and/or graphical user interface (GUI). Using the client interface 120, the compute environment management system 100 may present a graphical user interface (GUI) 920 for submitting jobs to a managed compute environment. The GUI 920 may include any suitable interface elements for choosing job types, specifying or referencing job code, and/or scheduling jobs.

The compute environment management system 100 may support different types of jobs such as basic jobs, array jobs, and parallel jobs. A basic job (or a single replica thereof) may represent a command or shell script that will be executed once or retried until it is considered to have failed. An array job (or a single replica thereof) may represent a job that shares common parameters, such as virtual compute instances and memory, and that runs as a collection of related but separate basic jobs, potentially in parallel across multiple hosts. Examples of typical array jobs may include Monte Carlo simulations, parametric sweeps, and large rendering jobs. A parallel job (or a single replica thereof) may represent a parallel, tightly coupled workload, potentially using many compute instances running concurrently. Jobs may also be submitted as parts of workflows, such that some jobs may be scheduled only if their dependencies are met. In one embodiment, the GUI 920 may include an interface element 911 (e.g., a button) for choosing a basic job, an interface element 912 (e.g., a button) for choosing an array job, and/or an interface element 913 (e.g., a button) for choosing a parallel job.

The GUI 920 may include an interface element 914 (e.g., a button) for choosing to edit or enter inline program code for a job, along with an interface element 916 (e.g., a text entry box) for entry of inline program code, and/or an interface element 915 (e.g., a button) to upload or provide a reference to program code for a job. Additionally, the GUI 920 may include an interface element 917 (e.g., a button) to submit the job for execution without delay and/or an interface element 918 (e.g., a button) to schedule the job for execution at a later point in time. In one embodiment, the GUI 920 may also permit the selection of a particular queue (e.g., based on its queue identifier) for the job. Suitable user input to the GUI 920 may be used to submit jobs. For example, the user may operate a browser program on a client computing device that presents the GUI 920; the browser may then interact with the compute environment management system via an API to implement the submission of the job to the compute environment.

In one embodiment, a graphical user interface associated with the compute environment management system 100 may provide (e.g., to a user) analysis or results of the automated resource management. For example, a management console may present information about the cost of the compute environment over a particular period of time. The cost information may be presented in the aggregate and/or broken down by resource type, queue ID, and/or job type. As another example, a management console may present information about performance or usage analysis, such as job throughput, in the compute environment. The performance or usage information may be presented in the aggregate and/or broken down by resource type, queue ID, and/or job type. The management console may be implemented in the client interface 120.

ILLUSTRATIVE COMPUTER SYSTEM

In at least some embodiments, a computer system that implements a portion or all of one or more of the technologies described herein may include a computer system that includes or is configured to access one or more computer-readable media. FIG. 10 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   a plurality of pools of computing resources of a provider network, wherein the pools comprise a first pool and a second pool, and wherein the computing resources in the first pool differ in at least one execution characteristic from the computing resources in the second pool, wherein the at least one execution characteristic comprises reliability of task execution; and
   one or more computing devices configured to implement a compute environment management system, wherein the compute environment management system is configured to:
      receive a job definition comprising a description of a compute task, wherein the compute task is idempotent;
      generate a plurality of replicas of the compute task;
      select and reserve a plurality of the computing resources from the first pool of computing resources instead of one of the computing resources from the second pool of computing resources that differ in the reliability of task execution from the first pool of computing resources, wherein the selection of the plurality of computing resources from the first pool is made based at least in part on lesser reliability of generating a particular result by executing the compute task using a single resource in the first pool of computing resources in comparison to generating the particular result by executing the compute task using a single resource in the second pool of computing resources and greater reliability and less time to generate the particular result by executing multiple replicas of the compute task using multiple resources concurrently in the first pool of computing resources in comparison to generating the particular result by executing the compute task using the single resource in the second pool of computing resources;
      deploy the replicas of the compute task to one or more compute environments comprising the computing resources selected and reserved from the first pool, wherein concurrent execution of the replicas is initiated using the computing resources selected and reserved from the first pool, wherein input data for the concurrent execution does not vary from one of the replicas to another of the replicas, and wherein at least a portion of the replicas produce individual results for the input data; and
      select an individual result of one of the replicas as a final result of the compute task to send to a client, wherein the individual result of the replica is selected as the final result to send to the client based at least in part on agreement of the individual result of the replica with at least one other individual result produced by at least another of the replicas of the compute task.

2. The system as recited in claim 1, wherein the at least one execution characteristic comprises an interruptibility and wherein the computing resources selected from the first pool are selected based at least in part on greater interruptibility in comparison to the computing resources in the second pool.

3. The system as recited in claim 1, wherein the individual result of the replica is a first result produced by the replicas and the at least one other individual result is a subsequent result produced by at least the other replica.

4. The system as recited in claim 1, wherein the individual result is a first result of the replicas and is selected as the final result based at least in part on agreement of the individual result with a plurality of subsequent individual results produced by a plurality of the other replicas of the compute task.

5. A computer-implemented method, comprising:
generating a plurality of replicas of a task;
selecting a plurality of computing resources from at least one pool of computing resources of a provider network instead of one of the computing resources from another pool of computing resources of the provider network, wherein the plurality of pools vary in at least one characteristic comprising reliability of task execution, and wherein the selection of the plurality of computing resources of the at least one pool is made based at least in part on lesser reliability of generating a particular result by executing the compute task using a single resource in the at least one pool of computing resources in comparison to generating the particular result by executing the compute task using a single resource in the other pool of computing resources and greater reliability and less time to generate the particular result by executing multiple replicas of the compute task using multiple resources concurrently in the at least one pool of computing resources in comparison to generating the particular result by executing the compute task using the single resource in the other pool of computing resources;
initiating concurrent execution of the replicas of the task using the plurality of selected computing resources, wherein input data for the concurrent execution does not vary from one of the replicas to another of the replicas, and wherein at least a portion of the replicas produce individual results; and
selecting an individual result of one of the replicas as a final result of the task to send to a client, wherein the individual result of the replica is selected as the final result to send to the client based at least in part on agreement of the individual result of the replica with at least one other individual result produced by at least another of the replicas of the compute task.

6. The method as recited in claim 5, wherein the at least one characteristic comprises an interruptibility characteristic, and wherein the plurality of computing resources are selected from the at least one pool based at least in part on greater interruptibility in comparison to the computing resources in the other pool.

7. The method as recited in claim 5, wherein the individual result is selected as the final result based at least in part on a policy of selecting an individual result of a first of the replicas of the task to complete the concurrent execution successfully.

8. The method as recited in claim 5, wherein the individual result is selected as the final result based at least in part on a policy of determining an agreement of two or more other individual results of two or more of the other replicas of the task with the individual result.

9. The method as recited in claim 5, wherein at least one of the plurality of computing resources fails to complete the concurrent execution successfully.

10. The method as recited in claim 5, further comprising:
submitting the replicas of the task to a plurality of job queues mapped to a plurality of compute environments, wherein the plurality of compute environments comprise the plurality of computing resources selected from the at least one pool.

11. The method as recited in claim 5, wherein the plurality of computing resources are selected based at least in part on variation in geographical location.

12. The method as recited in claim 5, wherein the plurality of computing resources are selected based at least in part on a need-by time associated with the task, and wherein the final result of the concurrent execution is determined by the need-by time.

13. The method as recited in claim 5, wherein the task is submitted by the client, wherein the replicas of the task are generated without informing the client, and wherein the individual result is selected as the final result based at least in part on programmatic application of a policy.

14. A computer-readable storage medium storing program instructions that, if executed, perform:
generating a plurality of replicas of a task, wherein the task is idempotent;
selecting a plurality of computing resources from a pool of computing resources of a provider network instead of one of the computing resources from another pool of computing resources of the provider network, wherein the plurality of pools vary in at least one execution characteristic comprising reliability of task execution, and wherein the selection of the plurality of computing resources of the pool is made based at least in part on lesser reliability of generating a particular result by executing the compute task using a single resource in the pool of computing resources in comparison to generating the particular result by executing the compute task using a single resource in the other pool of computing resources and greater reliability and less time to generate the particular result by executing multiple replicas of the compute task using multiple resources concurrently in the pool of computing resources in comparison to generating the particular result by executing the compute task using the single resource in the other pool of computing resources;
initiating concurrent execution of the replicas of the task using the selected plurality of computing resources, wherein input data for the concurrent execution does not vary from one of the replicas to another of the replicas, and wherein at least a portion of the replicas produce individual results of the task given the input data; and
selecting an individual result of one of the replicas as a final result of the task to send to a client, wherein the individual result of the replica is selected as the final result to send to the client based at least in part on agreement of the individual result of the replica with at least one other individual result produced by at least another of the replicas of the compute task.

15. The computer-readable storage medium as recited in claim 14, wherein the at least one execution characteristic comprises an interruptibility characteristic, and wherein the plurality of computing resources are selected from the pool based at least in part on greater interruptibility in comparison to the computing resources in the other pool.

16. The computer-readable storage medium as recited in claim 14, wherein the individual result is selected as the final result based at least in part on a policy of selecting an individual result of a first of the replicas of the task to complete the concurrent execution successfully.

17. The computer-readable storage medium as recited in claim 14, wherein the individual result is selected as the final result based at least in part on a policy of determining an agreement of two or more other individual results of two or more of the other replicas of the task with the individual result.

18. The computer-readable storage medium as recited in claim 14, wherein at least one of the plurality of computing resources fails to complete the concurrent execution successfully.

19. The computer-readable storage medium as recited in claim 14, wherein the program instructions are further computer-executable to perform:

submitting the replicas of the task to a plurality of job queues mapped to a plurality of compute environments, wherein the plurality of compute environments comprise the plurality of computing resources selected from the pool.

20. The computer-readable storage medium as recited in claim 14, wherein the plurality of computing resources are selected based at least in part on variation in geographical location.

\* \* \* \* \*